(12) United States Patent
Crue et al.

(10) Patent No.: US 7,038,882 B2
(45) Date of Patent: May 2, 2006

(54) LOW MOMENT-HIGH MOMENT WRITE POLE WITH NON-MAGNETIC LAYER FOR ESTABLISHING A MAGNETIC PATH DISCONTINUITY BETWEEN LAYERS OF THE WRITE POLE

(75) Inventors: Billy W. Crue, Pittsburgh, PA (US); Erik Svedberg, Pittsburgh, PA (US); Robert Rottmayer, Wexford, PA (US); Dmitri Litvinov, Pittsburgh, PA (US); Sakhrat Khizroev, Coral Gables, FL (US)

(73) Assignee: Seagate Technology, Scotts Valley, CA (US)

( * ) Notice: Subject to any disclaimer, the term of this patent is extended or adjusted under 35 U.S.C. 154(b) by 320 days.

(21) Appl. No.: 10/453,759

(22) Filed: Jun. 3, 2003

(65) Prior Publication Data
US 2004/0066574 A1 Apr. 8, 2004

Related U.S. Application Data

(60) Provisional application No. 60/415,953, filed on Oct. 3, 2002.

(51) Int. Cl.
*G11B 5/147* (2006.01)
(52) U.S. Cl. ..................................... 360/126
(58) Field of Classification Search ............... 360/125, 360/126
See application file for complete search history.

(56) References Cited

U.S. PATENT DOCUMENTS

| | | | |
|---|---|---|---|
| 4,078,300 A | 3/1978 | Lazzari | |
| 4,639,810 A | 1/1987 | Sakai | |
| 4,768,121 A | 8/1988 | Nakashima et al. | |
| 4,803,582 A | 2/1989 | Sakai | |
| 4,858,048 A | 8/1989 | Hayakawa et al. | |
| 4,873,599 A | 10/1989 | Sueoka | |
| 5,073,836 A | 12/1991 | Gill et al. | |
| 5,157,570 A | 10/1992 | Shukovsky et al. | |
| 5,225,953 A | 7/1993 | Wada et al. | |
| 5,606,478 A | 2/1997 | Chen et al. | |
| 5,668,689 A | 9/1997 | Schultz et al. | |
| 5,995,341 A | 11/1999 | Tanaka et al. | |
| 6,101,068 A | 8/2000 | Ohtomo et al. | |
| 6,163,442 A | 12/2000 | Gill et al. | |
| 6,259,583 B1 * | 7/2001 | Fontana et al. | 360/126 |
| 6,504,675 B1 | 1/2003 | Shukh et al. | |
| 6,721,131 B1 * | 4/2004 | Litvinov et al. | 360/125 |
| 6,791,796 B1 * | 9/2004 | Shukh et al. | 360/126 |
| 6,813,115 B1 * | 11/2004 | Van der Heijden et al. | 360/125 |

* cited by examiner

*Primary Examiner*—David Davis
(74) *Attorney, Agent, or Firm*—Pietragallo, Bosick & Gordon LLP; Benjamin T. Queen, II (57) ABSTRACT

A write pole for a magnetic recording head, such as a perpendicular magnetic recording head, includes a first magnetic layer comprising a material having a first saturation magnetic moment and a second magnetic layer adjacent the first magnetic layer wherein the second magnetic layer comprises a material having a second saturation magnetic moment that is greater than the first saturation magnetic moment. The write pole also comprises a non-magnetic layer between a portion of the first magnetic layer and the second magnetic layer. The non-magnetic layer may be formed between the first magnetic layer and the second magnetic layer adjacent an air-bearing surface of the recording head. A disc drive storage system having a recording head with means for reducing skew sensitivity of the recording head is also disclosed.

23 Claims, 5 Drawing Sheets

LOW MOMENT-HIGH MOMENT WRITE POLE WITH NON-MAGNETIC LAYER FOR ESTABLISHING A MAGNETIC PATH DISCONTINUITY BETWEEN LAYERS OF THE WRITE POLE

CROSS REFERENCE TO RELATED APPLICATION

This application claims the benefit of U.S. Provisional Application No. 60/415,953 filed Oct. 3, 2002.

FIELD OF THE INVENTION

The invention relates to recording heads, and more particularly, to a write pole of a recording head having low moment and high moment layers with a non-magnetic layer formed therebetween.

BACKGROUND OF THE INVENTION

Magnetic recording heads have utility in a magnetic disc drive storage system. Most magnetic recording heads used in such systems today are "longitudinal" magnetic recording heads. An alternative to longitudinal recording is "perpendicular" magnetic recording. Perpendicular magnetic recording is believed to have the capability of extending recording densities well beyond the limits of longitudinal magnetic recording.

Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between that pole and a soft underlayer of the storage media. The soft underlayer is located below the hard magnetic recording layer of the storage media and enhances the amplitude of the field produced by the main pole. This allows the use of storage media with a higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media. A magnetic recording system such as, for example, a perpendicular magnetic recording system may utilize a write pole having uniform magnetic properties, i.e. the write pole is formed of a single material having a uniform magnetic moment. However, it is well known that such a write pole can exhibit skew effects which can degrade adjacent tracks. In addition, it is well known that the skew effects also result in non-desirable side writing occurring during the writing operation.

Accordingly, there is identified a need for an improved recording head that overcomes limitations, disadvantages, and/or shortcomings of known recording heads.

SUMMARY OF THE INVENTION

Embodiments of the invention meet the identified needs, as well as other needs, as will be more fully understood following a review of the specification and drawings.

In accordance with an aspect of the invention, a write pole for a magnetic recording head comprises a first magnetic layer, a second magnetic layer adjacent the first magnetic layer and a non-magnetic layer formed between a portion of the first magnetic layer and the second magnetic layer. The first magnetic layer comprises a material having a first saturation magnetic moment. The second magnetic layer comprises a material having a saturation magnetic moment that is greater than the first saturation magnetic moment of the first magnetic layer. The non-magnetic layer may be formed adjacent an air-bearing surface of the magnetic recording head.

In accordance with an additional aspect of the invention, a disc drive storage system comprises a magnetic recording medium and a magnetic recording head positioned adjacent the recording medium. The magnetic recording head includes a write pole for applying a write field to the magnetic recording medium. The write pole comprises a first magnetic layer comprising a material having a first saturation magnetic moment and a second magnetic layer adjacent the first layer, wherein the second magnetic layer comprises a material having a second saturation magnetic moment that is greater than the first saturation magnetic moment. The write pole further comprises means for influencing the write field to be applied substantially by the second magnetic layer. Advantageously, the means for influencing provides a means for reducing the skew sensitivity of the recording head.

In accordance with another aspect of the invention, a recording head comprises a perpendicular write pole having a first structure, a second structure and a non-magnetic member positioned between a portion of said first structure and said second structure. The first structure has a first saturation magnetic moment and the second structure has a second saturation magnetic moment. The second saturation magnetic moment is greater than the first saturation magnetic moment such that the first structure acts as a flux conducting portion and the second structure acts as a flux concentrating portion.

DETAILED DESCRIPTION OF THE INVENTION

The invention provides a magnetic recording head, and more particularly a write pole of a magnetic recording head. The invention is particularly suitable for use with a magnetic disc drive storage system having a perpendicular magnetic recording head. A recording head, as used herein, is generally defined as a head capable of performing read and/or write operations. Perpendicular magnetic recording, as used herein, generally refers to orienting magnetic domains within a magnetic storage medium substantially perpendicular to the direction of travel of the recording head and/or recording medium.

Figure 1:
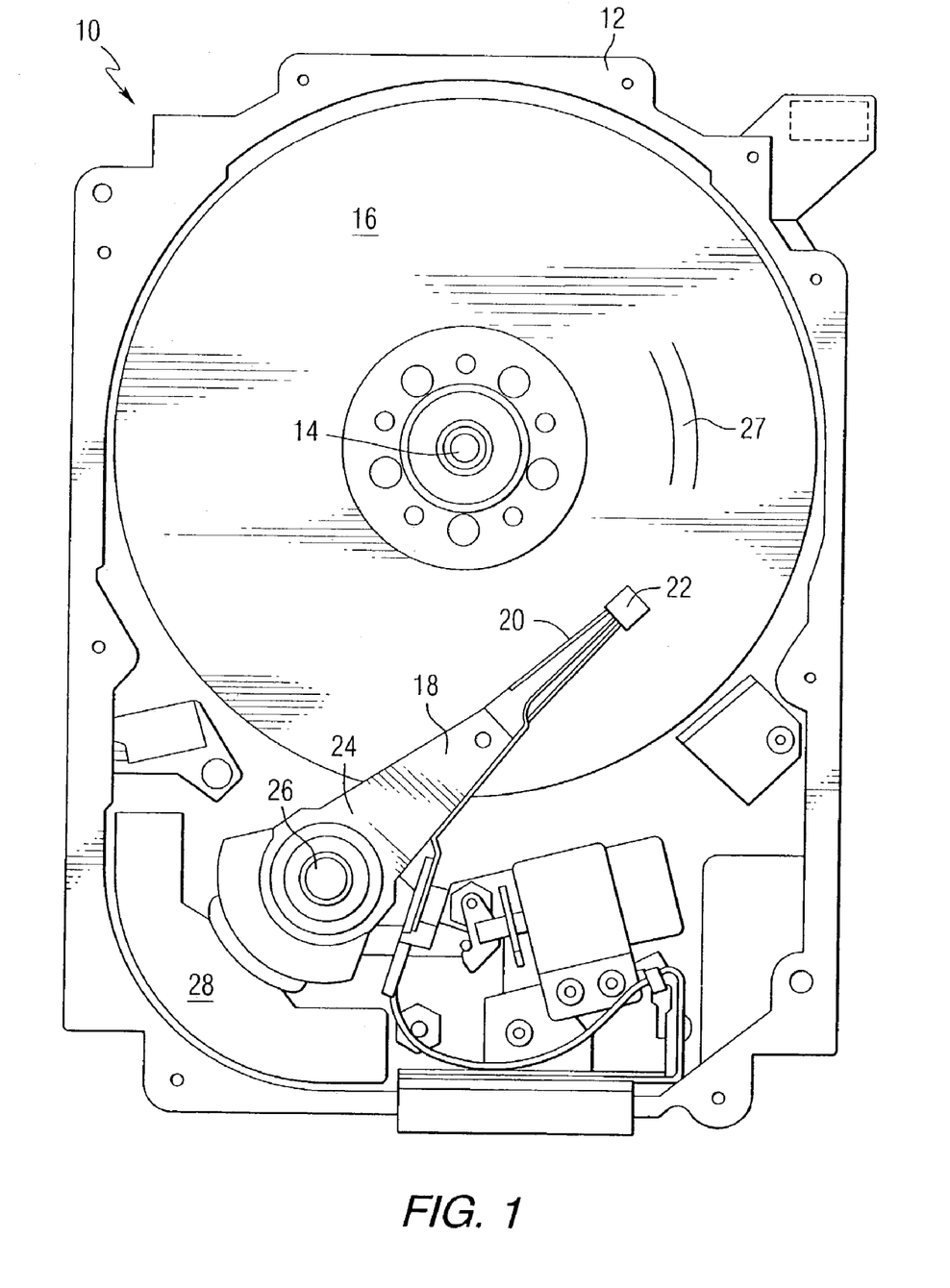
FIG. 1 is a pictorial representation of a disc drive system that may utilize a magnetic recording head in accordance with the invention.

FIG. 1 is a pictorial representation of a disc drive 10 that can utilize a perpendicular magnetic recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

A perpendicular magnetic recording system constructed in accordance with the invention may utilize a write pole having a "hybrid" design wherein, for example, a high saturation magnetic moment material is formed on top of or adjacent to a low saturation magnetic moment material. The hybrid write pole design is described in U.S. patent application Ser. No. 09/776,363 filed Feb. 2, 2001 and entitled "Write Pole For A Magnetic Recording Head Having A Layered Low Magnetic Moment And High Magnetic Moment Material" that is commonly owned by the assignee of the present invention, the full disclosure of which is hereby incorporated by reference. Specifically, the hybrid pole design provides the advantages of generating a strong magnetic field due to the existence of a thick channel for the magnetic flux, formed by both the low moment material and high moment material, and the advantage of localizing a strong magnetic field in the region defined by the thickness of the high moment material at the write pole's trailing edge that is required for writing on a high coercive medium.

Figure 2:
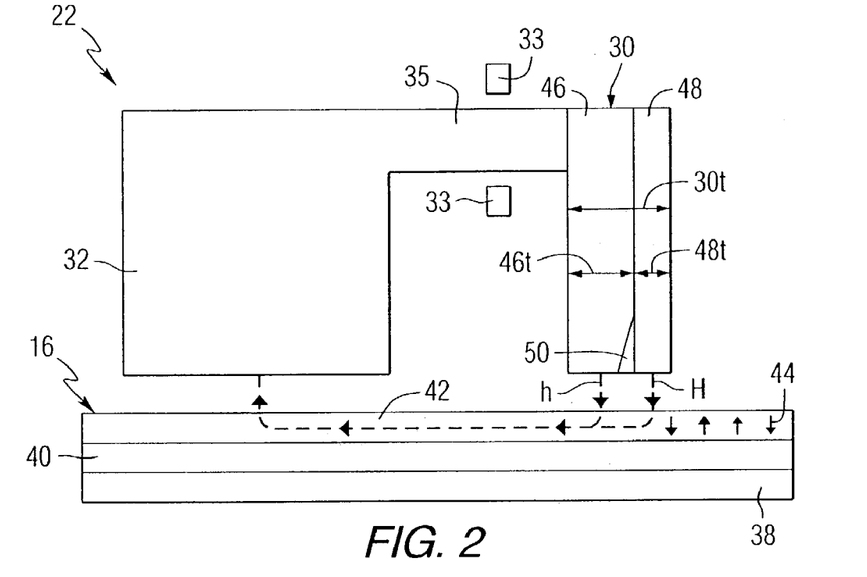
FIG. 2 is a partially schematic side view of a magnetic recording head and a magnetic recording medium in accordance with the invention.

FIG. 2 is a partially schematic side view of a perpendicular magnetic recording head 22 and a perpendicular magnetic recording medium 16. Although a preferred embodiment of the invention is described herein with reference to a perpendicular magnetic recording head, it will be appreciated that aspects of the invention may also be used in conjunction with other type recording. Specifically, the recording head 22 may include a writer section comprising a write pole 30 and a return or opposing pole 32 that are magnetically coupled by a yoke or pedestal 35. A magnetizing coil 33 surrounds the yoke or pedestal 35 for energizing the recording head 22. The recording head 22 also may include a read head, not shown, which may be any conventional type read head as is generally known in the art.

Still referring to FIG. 2, the perpendicular magnetic recording medium 16 is positioned adjacent to or under the recording head 22. The recording medium 16 includes a substrate 38, which may be made of any suitable material such as ceramic glass or amorphous glass. A soft magnetic underlayer 40 is deposited on the substrate 38. The soft magnetic underlayer 40 may be made of any suitable material such as, for example Co, Fe, Ni, or combinations thereof. A hard magnetic recording layer 42 is deposited on the soft underlayer 40, with the perpendicular oriented magnetic domains 44 contained in the hard layer 42. Suitable hard magnetic materials for the hard magnetic recording layer 42 may include, for example, CoCr, FePd, FePt, CoPd, CoFePd, CoCrPd, CoCrPt, or a multilayer structure formed of these materials.

In accordance with the invention, the write pole 30 includes a first magnetic layer 46 and a second magnetic layer 48. The second magnetic layer 48 may be formed directly adjacent to, in contact with, or on top of the first magnetic layer 46. The main write pole 30 may have a thickness 30$t$ in the range of about 50 nm to about 1000 nm. The first magnetic layer 46 may have a thickness 46$t$ in the range of about 40 nm to about 900 nm. The second magnetic layer 48 may have a thickness 48$t$ in the range of about 10 nm to about 100 nm.

Referring to FIG. 2, the first magnetic layer 46 is a relatively low saturation magnetic moment material that provides the necessary flux efficiency to conduct a substantial portion of the magnetic flux or magnetic field to the second magnetic layer 48. The second magnetic layer 48 is a relatively high saturation magnetic moment material that acts as the magnetic flux or magnetic field concentrating portion of the main write pole 30 that provides a strong magnetic write flux or field H which permits use of a magnetic storage medium having a relatively high anisotropy, thereby limiting or minimizing superparamagnetic instabilities at high recording densities. Although the write flux or field H is substantially applied by layer 48, a smaller amount of flux or field h will still disseminate from the layer 46. However, the flux or field h has a substantially less field magnitude than the field magnitude that is applied by layer 48. The flux or field H will, therefore, determine what is written to the media 16.

The first magnetic layer 46 is formed of a material having a saturation magnetic moment in the range of about 5 kiloGauss (kG) to about 16 kG. The material for layer 46 may comprise, for example, NiFe, CoZrTa, CoZrNb, $Ni_{45}Fe_{55}$, FeSi or combinations thereof. The second magnetic layer 48 is formed of a material having a saturation magnetic moment that is greater than the saturation magnetic moment of the material that is used to form the first magnetic layer 46. The second magnetic layer 48 has a saturation magnetic moment that is in the range of about 10 kG to about 25 kG. The material for layer 48 may comprise, for example, FeCo, FeCoB, FeTaN, FeSiC, FeAlN, FeCoNi or combinations thereof.

Figure 3:
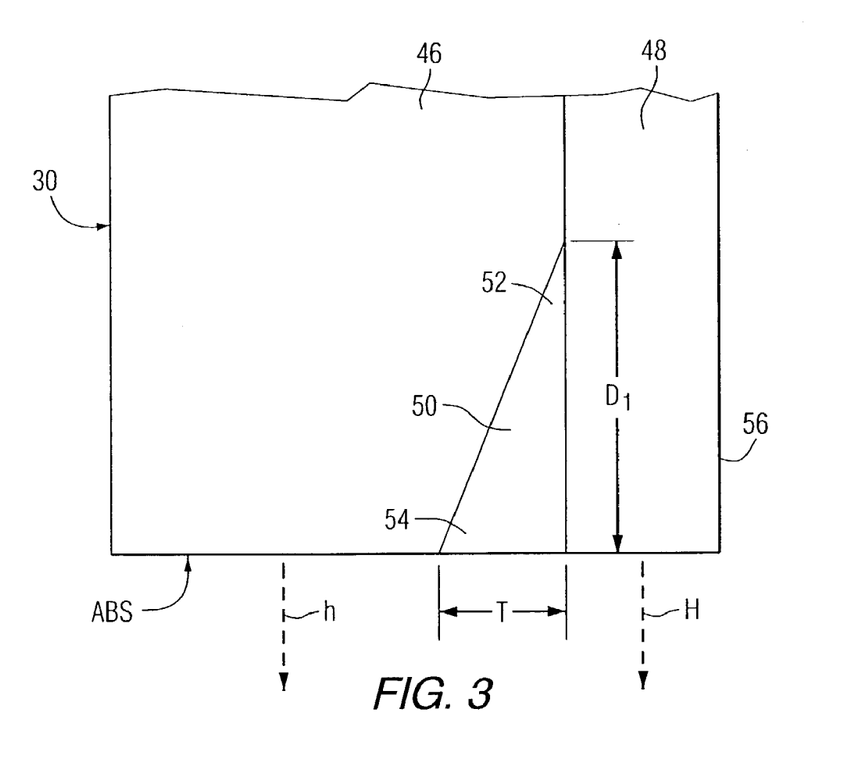
FIG. 3 is an enlarged, partial view of a write pole of the magnetic recording head shown in FIG. 2.

As illustrated in FIGS. 2 and 3, the write pole 30 also includes a non-magnetic layer 50 between a portion of the first magnetic layer 46 and the second magnetic layer 48. It will be appreciated that the layer 46, layer 48 and/or layer 50 may each comprise a single layer of the materials described herein or alternatively may each comprise multilayers of the materials described herein to form the same. For simplicity, the term "layer" is used herein to refer to either the single layer or multilayer configuration. The layer 50 may be positioned adjacent an air-bearing surface (ABS), or more specifically an ABS of the write pole 30. The layer 50 may extend from a first end 52 to a second end 54 a distance $D_1$ in the range of about 50 nm to about 100 nm between the first magnetic layer 46 and the second magnetic layer 48.

The layer 50 may have a varying thickness T in the range of about 10 nm to about 100 nm. Preferably, as illustrated in FIG. 3, the layer 50 has a greater thickness T at the second end 54 thereof adjacent the ABS.

The layer 50 may be formed of a non-magnetic material such as, for example, Al, Cu, $Al_2O_3$, BN or SiC. In addition, it may be beneficial to use non-magnetic metals because of improved metal-to-metal compatibility during the deposition process.

Figure 4:
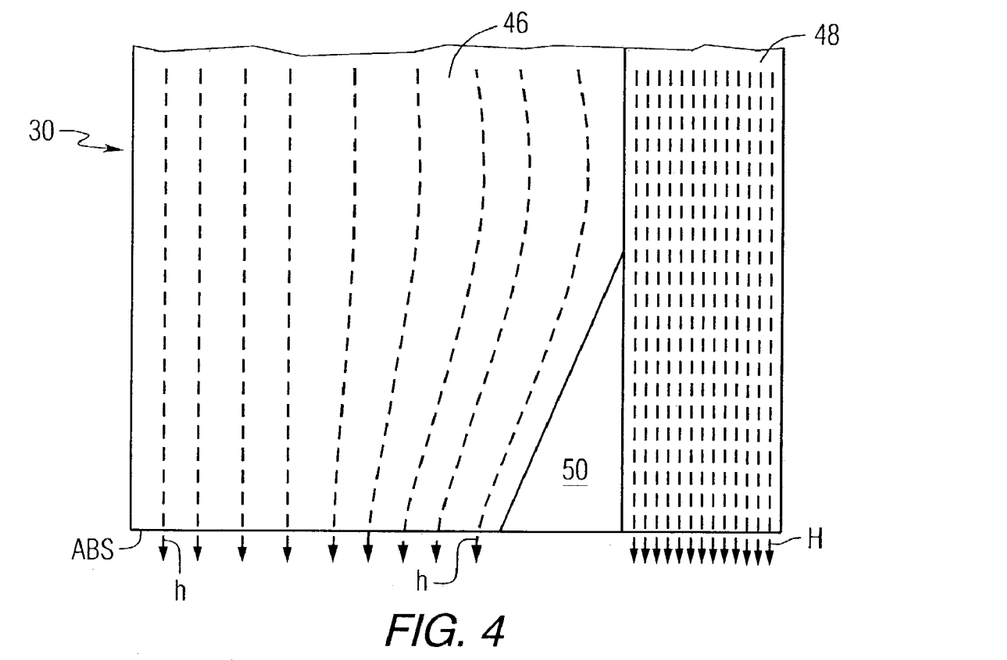
FIG. 4 is an enlarged, partial view similar to FIG. 3, only illustrating the flow of magnetic flux or field through the write pole.
Figure 5:
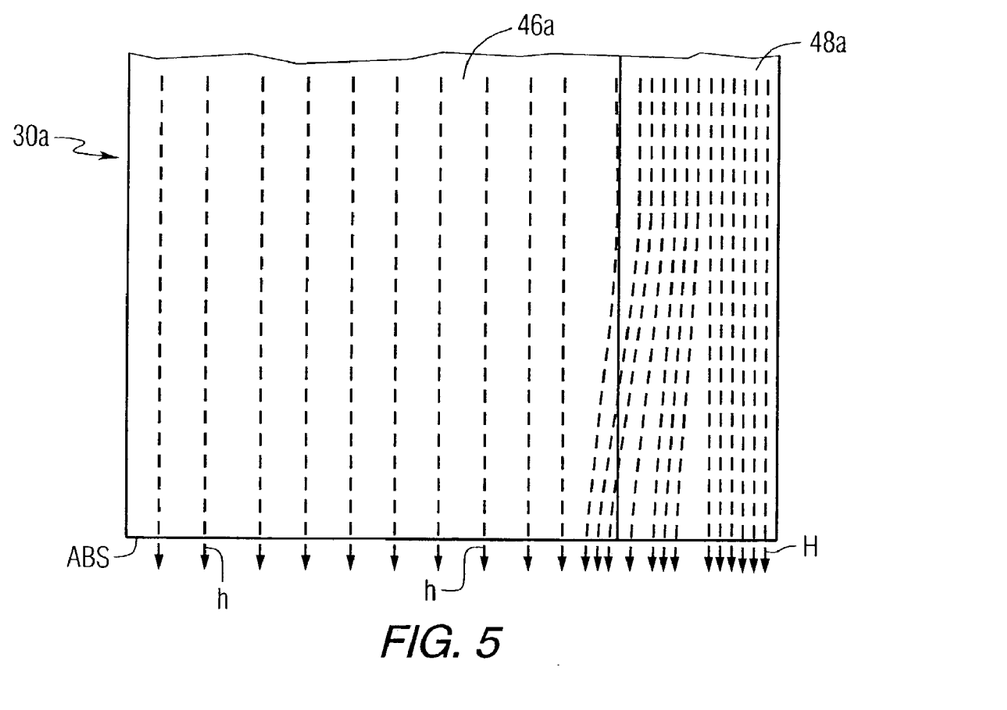
FIG. 5 is an enlarged, partial view similar to FIG. 4, only with the nonmagnetic spacer layer of the invention removed from the write pole.

Referring to FIGS. 3–5, the write pole 30 with layer 50 advantageously provides for influencing the write flux or field H to be substantially applied by the second magnetic layer 48 adjacent a trailing edge 56 of the write pole 30. By concentrating the write flux or field at the trailing edge 56, the write pole 30 with layer 50 provides for reducing the skew sensitivity of the recording head 22 and reducing side writing. More specifically, the role of layer 50 is to establish a magnetic path discontinuity between the high moment layer 48 and the low moment layer 46 to ensure sharper drop in the field amplitude from the high moment region to the low moment region. The layer 50 acts as a magnetic insulator preventing the flux leakage from the higher moment layer 48 to leak into the lower moment layer 46 near the ABS, thus keeping the higher field amplitude localized in the region under or adjacent to the higher moment layer 48. For example, FIG. 4 illustrates how layer 50 blocks or deflects the flux or field h away from the flux or field H that is concentrated in the higher moment layer 48. In contrast, FIG. 5 illustrates a write pole 30a having a low moment layer 46a and a higher moment layer 48a, the write pole 30a not having the non-magnetic layer 50. As shown in FIG. 5, without the layer 50 flux leakage may occur with some of the flux or field H leaking into the lower moment layer 46a adjacent the interface between the lower moment layer 46a and the higher moment layer 48a.

Figure 6:
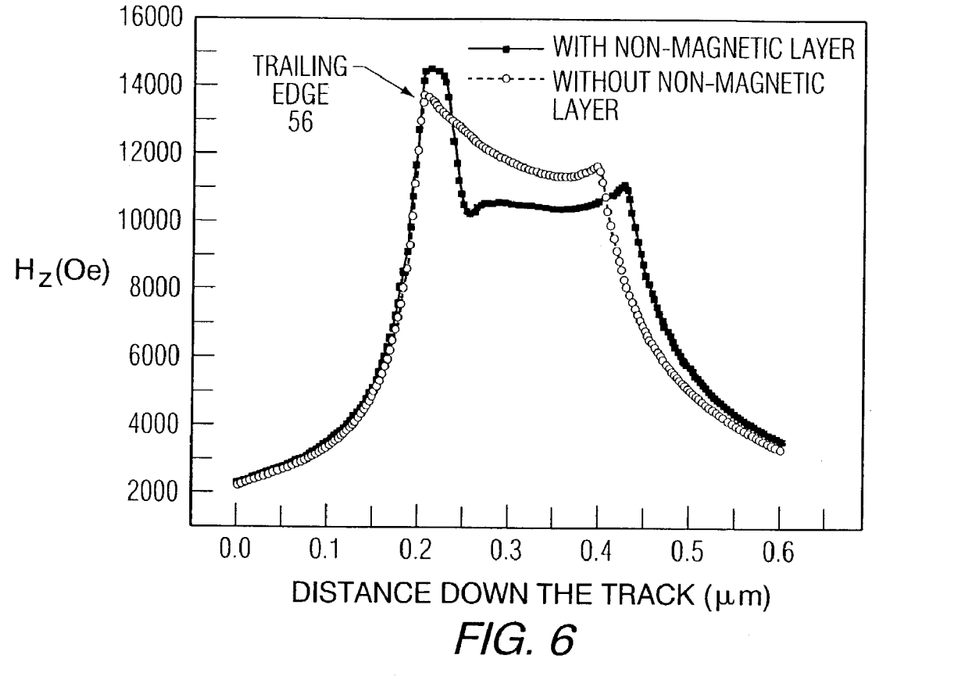
FIG. 6 is a graphical illustration of write field versus distance down the track on a medium for which a write field is applied.

FIG. 6 provides a graphical illustration of the effectiveness of the write pole 30 of the invention. Specifically, three dimensional boundary element modeling was performed to compare the recording field (Hz) generated by the write pole 30 having the layer 50 versus a write pole that does not include the non-magnetic or insulation layer. FIG. 6 illustrates that the write pole 30 having the layer 50 is capable of generating a larger recording field (for example, a recording field of approximately 14,500 Oe) at an area adjacent the trailing edge 56 of the write pole.

Figure 7:
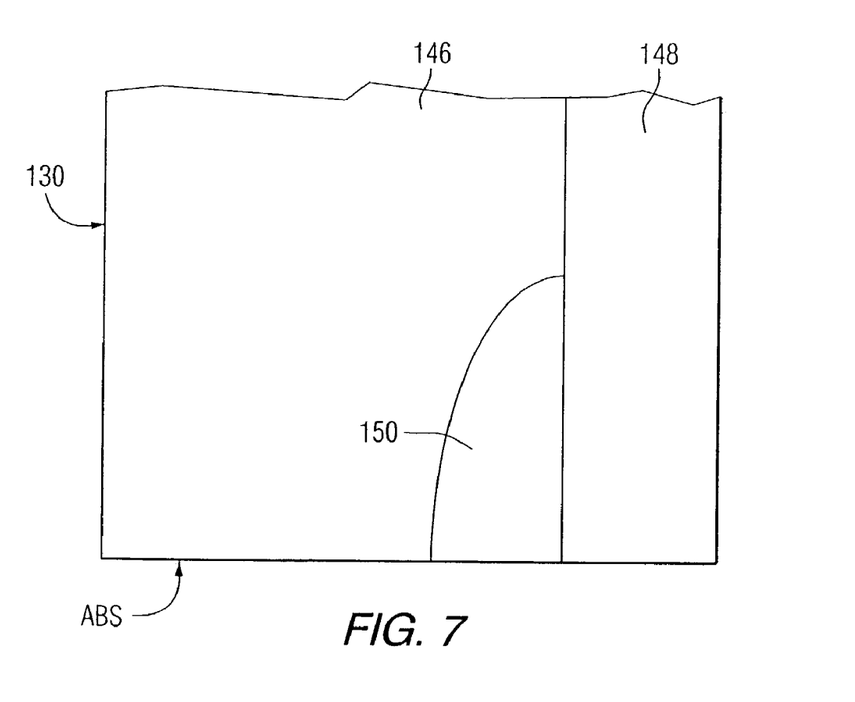
FIG. 7 is an enlarged, partial view similar to FIG. 3 but illustrating an additional embodiment of the invention.

Referring to FIG. 7, there is illustrated an additional embodiment of the invention. Write pole 130, which is similar to write 30 as described herein, includes a first magnetic layer 146 having a first saturation magnetic moment and a second magnetic layer 148 positioned adjacent to the first magnetic layer 146. The second magnetic layer 148 has a second saturation magnetic moment that is greater than the first saturation magnetic moment of the first magnetic layer 146. In addition, the write pole 130 includes a non-magnetic or insulation layer 150 that is formed between a portion of the first magnetic layer 146 and the second magnetic layer 148. The layer 150, while having a similar function and purpose as the layer 50 described herein, is formed to have a substantially hemi-paraboloidal cross-sectional shape as opposed to the substantially triangular cross-sectional shape of the layer 50. It will be appreciated, therefore, that the layers 50 or 150 may be formed in a variety of shapes and sizes in accordance with the invention.

Figure 8:
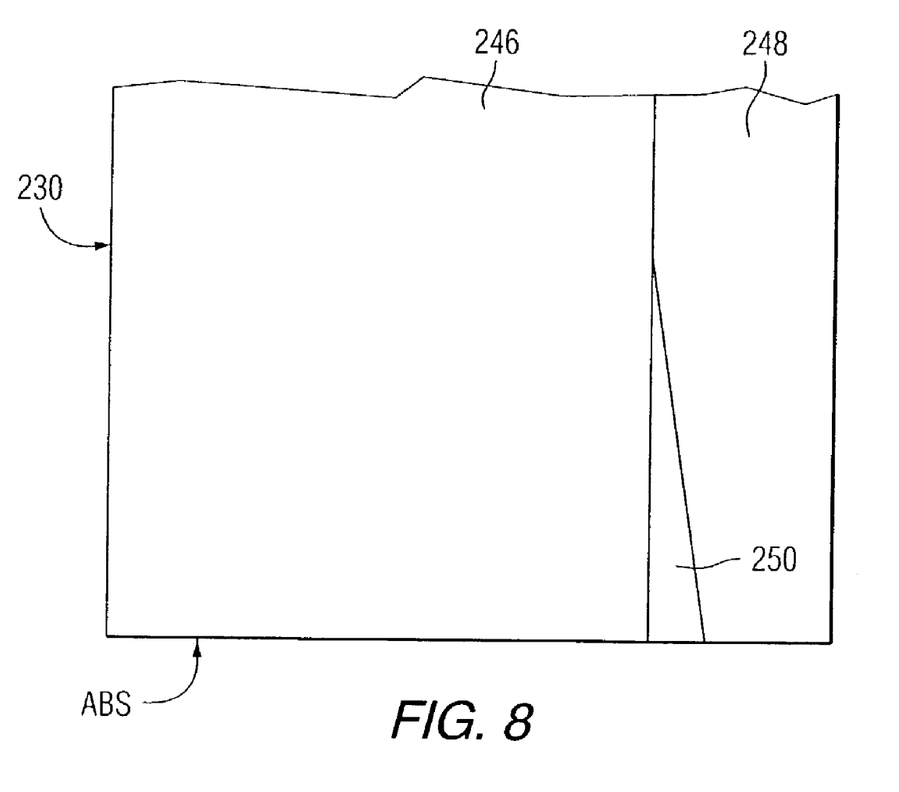
FIG. 8 is an enlarged, partial view similar to FIG. 3 but illustrating an additional embodiment of the invention.

Referring to FIG. 8, there is illustrated an additional embodiment of the invention. Write pole 230 includes a first magnetic layer 246 adjacent to a second magnetic layer. The write pole 230 also includes a non-magnetic or insulation layer 250 that is formed between a portion of the first layer 246 and the second layer 248. In this embodiment, the layer 250 is formed into the second layer 248 as opposed to the previous embodiments where layers 50 and 150 were formed into respective first layers 46 and 146.

The write poles described herein may be formed using techniques that are generally known in the art such as, for example, standard deposition, etching or ion beam milling techniques, and/or standard photoresist and lithography techniques.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A write pole for a magnetic recording head, comprising:
a first magnetic layer comprising a material having a first saturation magnetic moment;
a second magnetic layer adjacent said first magnetic layer, said second magnetic layer comprising a material having a second saturation magnetic moment that is greater than said first saturation magnetic moment of said first magnetic layer; and
a non-magnetic layer formed between a portion of said first magnetic layer and said second magnetic layer to establish a magnetic path discontinuity between said first magnetic layer and said second magnetic layer to influence a write field to be substantially applied by said second magnetic layer of the write pole.

2. The write pole of claim 1, wherein said non-magnetic layer is formed adjacent an air-bearing surface of the magnetic recording head.

3. The write pole of claim 1, wherein said non-magnetic layer has a substantially triangular cross-sectional shape.

4. The write pole of claim 1, wherein said non-magnetic layer has a substantially hemi-paraboloidal cross-sectional shape.

5. The write pole of claim 1, wherein said non-magnetic layer comprises Al, Cu, $Al_2O_3$, BN or SiC.

6. The write pole of claim 1, wherein said non-magnetic layer has a thickness in the range of about 10 nm to about 100 nm.

7. The write pole of claim 6, wherein said non-magnetic layer includes a first end and an opposing second end that is closer to an air-bearing surface of the recording head than said first end, the thickness of said second end being greater than the thickness of said first end.

8. The write pole of claim 1, wherein said non-magnetic layer extends between said first magnetic layer and said second magnetic layer a distance in the range of about 50 nm to about 100 nm.

9. The write pole of claim 1, wherein said first magnetic layer has a thickness in the range of about 40 nm to about 900 nm.

10. The write pole of claim 1, wherein said first magnetic layer comprises NiFe, CoZrTa, CoZrNb, $Ni_{45}Fe_{55}$, FeSi or combinations thereof.

11. The write pole of claim 1, wherein said first saturation magnetic moment is in the range of about 5 kG to about 16 kG.

12. The write pole of claim 1, wherein said second magnetic layer has a thickness in the range of about 10 nm to about 100 nm.

13. The write pole of claim 1, wherein said second magnetic layer comprises FeCo, FeCoB, FeTaN, FeSiC, FeAlN, FeCoNi or combinations thereof.

14. The write pole of claim 1, wherein said second saturation magnetic moment is in the range of about 10 kG to about 25 kG.

15. A disc drive storage system, comprising:
a magnetic recording medium; and
a magnetic recording head positioned adjacent said magnetic recording medium, said magnetic recording head including a write pole for applying a write field to said magnetic recording medium, said write pole comprising:
  a first magnetic layer comprising a material having a first saturation magnetic moment;
  a second magnetic layer adjacent said first magnetic layer, said second magnetic layer comprising a material having a second saturation magnetic moment that is greater than said first saturation magnetic moment of said first magnetic layer; and
  means for establishing a magnetic path discontinuity between said first magnetic layer and said second magnetic layer and influencing said write field to be substantially applied by said second magnetic layer.

16. The system of claim 15, wherein said means for influencing provides a means for reducing skew sensitivity of said magnetic recording head.

17. The system of claim 15, wherein said means for influencing comprises a non-magnetic layer formed between a portion of said first magnetic layer and said second magnetic layer.

18. The system of claim 15, wherein said magnetic recording head is a perpendicular magnetic recording head.

19. The system of claim 15, wherein said second magnetic layer is formed adjacent a trailing edge of said write pole.

20. A recording head, comprising:
a perpendicular write pole, comprising:
  a first structure having a first saturation magnetic moment;
  a second structure adjacent said first structure and having a second saturation magnetic moment; and
  a non-magnetic member positioned between a portion of said first structure and said second structure to establish a magnetic path discontinuity between said first structure and said second structure to influence a write field to be substantially applied by said second structure of the write pole.

21. The recording head of claim 20, wherein said second saturation magnetic moment is greater than said first saturation magnetic moment.

22. The recording head of claim 20, wherein said non-magnetic member is positioned adjacent an air-bearing surface of said perpendicular write pole.

23. The recording head of claim 20, wherein said non-magnetic member includes at least one layer of material comprising Al, Cu, $Al_2O_3$, BN or SiC.

* * * * *

UNITED STATES PATENT AND TRADEMARK OFFICE
CERTIFICATE OF CORRECTION

PATENT NO.         : 7,038,882 B2                                           Page 1 of 1
APPLICATION NO. : 10/453759
DATED              : May 2, 2006
INVENTOR(S)        : Billy W. Crue et al.

It is certified that error appears in the above-identified patent and that said Letters Patent is hereby corrected as shown below:

Title Page
(73) Assignee
"Seagate Technology" should read -- Seagate Technology LLC --

Column 6, Line 6
"...adjacent to a second magnetic layer." Should read --...adjacent to a second magnetic layer 248.--

Signed and Sealed this

Twenty-sixth Day of December, 2006

JON W. DUDAS
*Director of the United States Patent and Trademark Office*